June 23, 1959     L. J. SPERRY     2,892,137
HIGH VOLTAGE CAPACITOR
Filed Sept. 16, 1954

INVENTOR.
LEONARD J. SPERRY
BY
John W. Michael
ATTORNEY

United States Patent Office 2,892,137
Patented June 23, 1959

2,892,137

HIGH VOLTAGE CAPACITOR

Leonard J. Sperry, Wauwatosa, Wis., assignor to Globe-Union Inc., Milwaukee, Wis., a corporation of Delaware Application September 16, 1954, Serial No. 456,421

1 Claim. (Cl. 317—242)

This invention relates to high voltage capacitors and particularly to such capacitors which consist of a plurality and capacitors mounted and connected to make a unitary capacitor.

Heretofore, generally, it has been the practice to construct capacitors of the desired size in a single unit. For ceramic capacitors, this is an increasingly difficult problem as the capacitor size increases, due to the imperfections inherent in the molding of the unit. In large units, stresses, which cause cracks in the ceramic, are produced on the cooling of the unit. The use of smaller capacitors in parallel connection giving the same equivalent capacitance reduces the number of imperfect units. However, it is a problem to connect and hold a plurality of smaller capacitors in a compact unitary assembly.

It is the main object of this invention, therefore, to provide a high voltage capacitor unit with low electrical losses and at low cost.

It is another object of this invention to provide a high voltage capacitor consisting of several easily replaceable, high voltage capacitors connected to form a single unitary capacitor which has an overall breakdown voltage in air lower than the breakdown voltage of the individual capacitors to provide a safety factor and a low potential gradient resistant to the formation of corona, and which is inexpensive to manufacture.

The foregoing objects and others ancillary thereto are accomplished as follows:

A number of standard high voltage capacitors are placed side by side in parallel relationship with the opposite terminals of the individual capacitors attached to mounting plates each having a single terminal forming mounting screw. Two or more parallel groups may be connected in series by interposing between each parallel group a mounting plate from which the single terminal has been omitted. The individual capacitors are removable from between the mounting plates in case of break down. A ring is placed around each mounting plate and with the corners of each plate solidly attached to it. This ring provides curved surfaces which function to materially reduce the loss due to corona. The plate combined with the corona ring prevents localization of electrostatic charge and thereby retards voltage breakdown and reduces the electrical losses. The rings and plates are arranged so that the air gap between the rings will break down before the individual capacitors in case of a voltage overload.

The features of the invention described herein which I consider new and useful and therefore patentable are set forth in the claims below. The details and scope of the invention itself can best be understood by reading the specifications and analyzing the drawings, in which:

Figure 1:
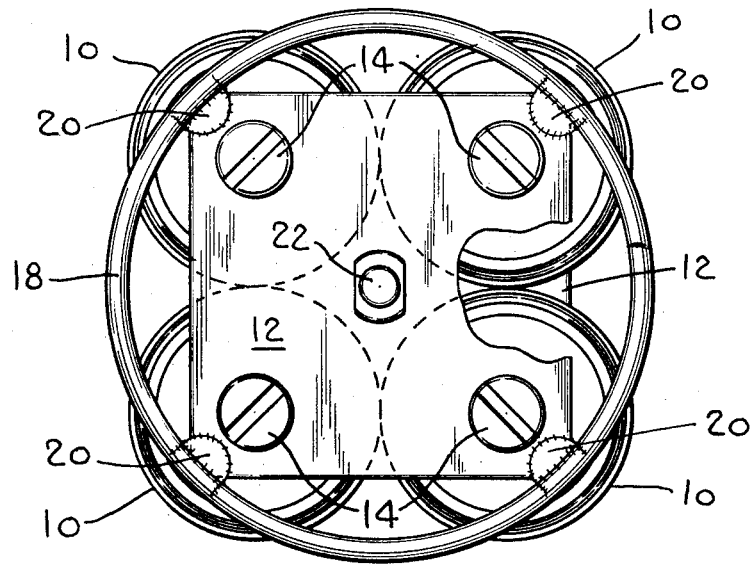
Fig. 1 is a plan view of a multiple capacitor unit embodying the invention.
Figure 2:
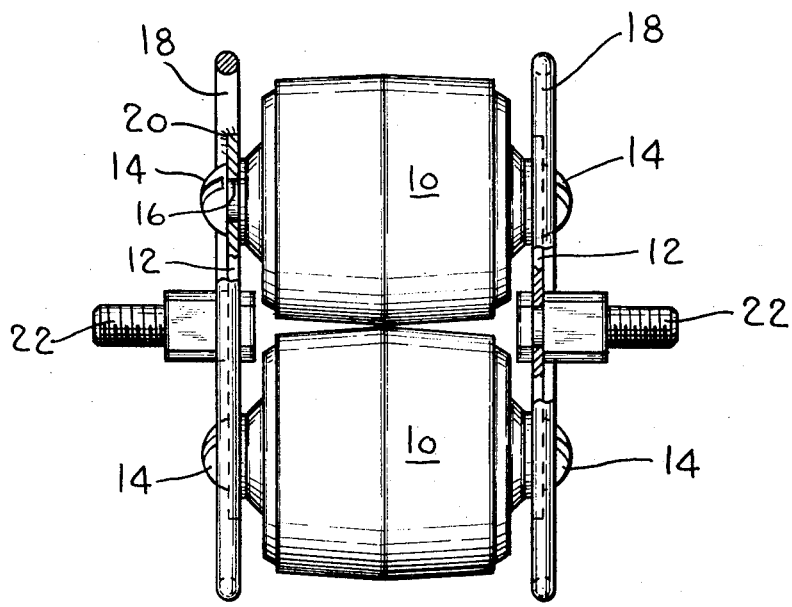
Fig. 2 is an elevation view of such unit.

The particular adaptation of this invention shown by the drawings has four identical high voltage capacitor units 10 constructed as known to those skilled in this art. Each capacitor has at its ends terminals which are internally threaded. The units are arranged in longitudinally parallel relationship between two mounting plates 12 to which they are mounted and electrically connected by screws 14 passing through holes 16 in such plates and threaded into such terminals. The mounting plates 12 are constructed of a metal with good conductivity and with sufficient thickness to insure adequate mechanical strength. Corona rings 18 concentrically surround each plate 12 and are solidly attached to the corners of such plates by weld or solder connections, indicated at 20. The corona protection of the ring is derived from outward presentation of smooth curved surfaces and may become more effective as the diameter of the wire of the ring is increased. The rings and plates are arranged so that the air gap between the rings will break down before the individual capacitors in case of a voltage overload. When two or more parallel units are to be connected in series to form a single series-parallel unit for higher voltage application, a single mounting 12 is placed between the capacitors of each parallel arrangement and studs passing through the holes 16 are used to secure two individual capacitors on opposite sides of such intermediate plate. Terminals 22 are centrally located on each mounting plate 12 positioned at the ends of the unit and extend outwardly from the plate. They may be threaded and thus readily attached to any electrical circuit or mounting board.

Instead of making the end plates of two pieces as shown, they could be made from single disk-like pieces, the circumferences of which are provided with rolled edges. The essential thing is to eliminate any sharp corners at the edges of the end plates.

The multiple capacitor unit as set forth has the following advantages: (1) high capacity (2000 m.m.f.) is attained by parallel connection of the more easily produced standardized capacitors of lower capacitance, (2) production costs of the entire unit are less than for an equivalent single capacitor, (3) replacement of the single capacitors comprising the unit is easily made at low cost, (4) the corona loss at high voltage is reduced by the corona rings, (5) the unit is designed to break down under overload between the rings instead of through the individual capacitors, and (6) the unit is well balanced electrically as well as mechanically and is easily handled and mounted and connected in circuits.

Although only one specific embodiment of this invention has been shown and described, many modifications are possible. This invention, therefore, is not to be restricted except in so far as is necessitated by the prior art and by the spirit of the appended claim.

I claim as my invention:

A capacitor comprising four identical individual capacitor units arranged in longitudinal parallel relationship equally angularly positioned about a common central axis, said capacitor units having terminals at opposite ends, a square metal mounting plate at each end of said capacitor units having corners in alinement with radii extending from said common central axis through said terminals, said terminals being connected with said plates to provide support for said capacitor units and to electrically connect them in parallel, main terminals centrally located on said square plates and extending outwardly therefrom, and a corona ring concentrically surrounding each square plate and solidly attached to the corners thereof, the distance from said common central axis to said corona ring being less than the distance from said axis to the outermost parts of the peripheries of said capacitor units.

References Cited in the file of this patent

UNITED STATES PATENTS

| | | |
|---|---|---|
| 1,759,230 | Dubilier | May 20, 1930 |
| 1,869,168 | Proctor | July 26, 1932 |
| 2,000,673 | Terman | May 7, 1935 |

FOREIGN PATENTS

| | | |
|---|---|---|
| 613,670 | Great Britain | Dec. 1, 1948 |